United States Patent [19]
Khac

[11] 4,451,617
[45] May 29, 1984

[54] MISCIBLE POLYBLEND AND MOLDED ARTICLE PRODUCED THEREFROM

[75] Inventor: Bi L. Khac, West Chester, Pa.

[73] Assignee: Atlantic Richfield Company, Los Angeles, Calif.

[21] Appl. No.: 408,377

[22] Filed: Aug. 16, 1982

[51] Int. Cl.³ .............................................. C08L 39/04
[52] U.S. Cl. ...................................... 525/203; 525/72; 525/73; 525/74; 525/76; 525/83; 525/207
[58] Field of Search ................... 525/203, 207, 76, 83, 525/72, 73, 74

[56] References Cited
U.S. PATENT DOCUMENTS 3,998,907 12/1976 DiGiulio ............................... 525/57

Primary Examiner—J. Ziegler
Attorney, Agent, or Firm—Dennis M. Kozak

[57] ABSTRACT

A miscible polyblend comprising an α, β-ethylencially unsaturated dicarboxylic acid or its anhydride copolymerized with at least one monovinyl-substituted aryl hydrocarbon monomer and an imide derivative of maleic anhydride copolymerized with at least one monovinyl-substituted-aryl hydrocarbon monomer is disclosed.

7 Claims, No Drawings

MISCIBLE POLYBLEND AND MOLDED ARTICLE PRODUCED THEREFROM

This invention relates to a mixture of two copolymers and to molded articles produced therefrom.

In one of its more specific aspects, this invention pertains to a mixture of two copolymers which exhibit miscibility with one another. This miscibility is evidenced by the mixture exhibiting a single glass transition temperature.

It is well known in the polymer art that most polymers are immiscible with one another. Typically, when an attempt is made to prepare a uniform or homogeneous polyblend, the resulting blend exhibits two or more glass transition temperatures indicating two or more separate phases. In the art, incompatibility of polymers is the accepted rule and the discovery of miscible polymers is the exception to the rule.

A miscible polyblend has now been discovered which comprises a first and a second copolymer, the first copolymer comprising an $\alpha,\beta$ ethylenically unsaturated dicarboxylic acid or its anhydride copolymerized with at least one monovinylsubstituted aryl hydrocarbon monomer and, the second copolymer comprising an imide derivative of maleic anhydride and having the general formula:

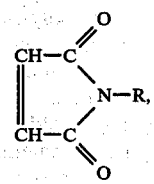

wherein R represents —$CH_3$, —$C_2H_5$, —$C(CH_3)_3$, a phenyl or substituted phenyl group, or a cycloalkyl or substituted cycloalkyl group copolymerized with at least one monovinyl substituted aryl hydrocarbon monomer.

As used herein, the term "polyblend" is understood to mean a mixture in any proportion of two copolymers, the mixture being made after the copolymers have been polymerized.

As used herein, the term "misciblity" means the ability of one polymer to mix or blend uniformly with another such that the blend yields a single phase as evidenced by a single glass transition temperature.

As the first copolymer, use can be made of any non-equimolar copolymer containing less than 50 mole percent of an $\alpha,\beta$-ethylenically unsaturated dicaboxylic acid or its anhydride and more than 50 percent mole percent of a monovinyl-substituted aryl hydrocarbon monomer.

Dicarboxylic acids and anhydrides particularly suitable for use include maleic, fumaric, itaconic, citraconic, mesaconic, ethyl maleic, methyl itaconic, chloromaleic, bromomaleic, dichloromaleic, dibromomaleic, phenylmaleic and the like.

Suitable for use as the copolymerizable monovinyl-substituted aryl hydrocarbon monomers are those monomers containing 8 to 20 carbon atoms including styrene, alphamethyl styrene, nuclear methyl styrenes, ethyl styrene, isopropyl styrene, tert-butyl styrene, chlorostyrenes, dichlorostyrenes, bromostyrenes, dibromostyrenes, vinylnaphthalene, and the like.

Suitable non-equimolar first copolymers may be prepared by any of the several methods available for the preparation of non-equimolar copolymers or, they may be purchased commercially.

If desired, these copolymers may be prepared by solution polymerization directly from the respective monomers by the incremental addition of the reactive monomer as taught by U.S. Pat. No. 2,971,939; by a continuous recycle polymerization process such as described in U.S. Pat. Nos. 2,769,804 and 2,989,517; or by the suspension polymerization process described in U.S. Pat. No. 3,509,110. The teachings of these patents are incorporated herein by reference.

Also suitable for use as first copolymers are non-equimolar copolymers which have been impact modified using any art-recognized method of incorporating the impact modifier, which modifier is typically a copolymer or homopolymer rubber or mixtures thereof. Preferably, the impact modifiers are incorporated into the monomer mixture prior to polymerization using for example, the method of U.S. Pat. No. 4,097,551 incorporated herein by reference.

Particularly suitable for use as first copolymers are the non-equimolar copolymers of styrene and maleic anhydride designated Dylark ® copolymers, commercially available from ARCO Chemical Company, division of Atlantic Richfield Company. Suitable Dylark copolymers include those of the 200 series the 300 series and Dylark 700 copolymer. Those copolymers designated Dylark 250, Dylark 350 and Dylark 700 are impact-modified.

Particularly suitable for use in the blends of this invention and employed in the following examples is Dylark 290 copolymer. Dylark 290 copolymer is a styrene-maleic anhydride copolymer containing about 17 weight percent maleic anhydride, 83 weight percent styrene and having the following properties:

| Resin Properties | ASTM Method | Value |
| --- | --- | --- |
| Tensile Strength, psi | D638-72 | 6,000 |
| Tensile Elongation, % | D638-72 | 2 |
| Flexural Strength, psi | D790-71 | 12,800 |
| Flexural Modulus, $10^{-5}$, psi | D790-71 | 5.5 |
| Izod Impact, ft.lbs./inch | D256-73 | 0.8 |
| Deflection Temperature Under Load, °F. 264 psi ⅛"×½"×5" Specimen | D648-72 | 230 |
| Vicat Softening Point, °C. | D1525-70 | 138 |
| Melt Flow, Condition "L" | D1238-73 | 2.0 |

Second copolymers suitable for use in the polyblends of this invention are copolymers of an imide derivative of maleic anhydride as described above copolymerized with at least one monovinyl-substituted aryl hydrocarbon monomer, described above with respect to the first copolymer.

Particularly suitable copolymers for use as the second copolymer include N-phenyl maleimide/styrene copolymer and N-phenyl maleimide/alpha methyl styrene copolymer, N-phenyl maleimide/p-t-butyl styrene copolymer and N-phenyl maleimide/p-methyl styrene copolymer.

Methods for preparing these second copolymers are well known and are taught, for example, in J. Marcromol, *Sci Chem*, All(s), pp 267–286 (1977) incorporated herein by reference. The N-phenyl maleimide/styrene copolymer and the N-phenyl maleimide/alpha methyl styrene copolymers employed in the following examples were prepared according to the procedure taught in U.S. Pat. No. 3,431,276 (Example 18) to Eric Nield, incorporated herein by reference.

The polyblends of this invention, comprising the first and second copolymers described above, can be prepared using any conventional method of blending including dry powder blending, coagulation from a solution of the copolymers, melt mixing, milling, extrusion and the like.

The following examples further demonstrate the invention.

EXAMPLE I

This example demonstrates the preparation of both N-phenyl maleimide monomer and N-phenyl maleimide/styrene copolymer suitable for use in the polyblends of this invention.

25 parts of N-phenyl maleamic acid and 10 parts of xylene were heated with reflux and stirred in a Dean-Stark apparatus for about 3 hours together with 1 part of sulfuric acid. At the end of this period 2.2 parts of water had been collected. The yield after removal of insoluble by-products, cooling and drying was 4.93 parts of N-phenyl maleimide.

N-phenyl maleimide and styrene were copolymerized in bulk as follows. 85 grams of N-phenyl maleimide produced as described above, and 421 grams of styrene were charged to a 1 liter reactor and purged with nitrogen. The temperature in the reactor was increased to 70° C., 0.5 grams of benzoyl peroxide initiator charged, and the temperature raised to 90° C. The polymerization reaction proceeded for about 15 minutes. The polymerization product was recovered by precipitating in methanol and drying.

The resulting N-phenyl maleimide/styrene copolymer was tested and found to have a peak Mn of 270,000, a glass transition temperature of 212° C. as measured by dynamic mechanical analysis (DMA) and an N-phenyl maleimide content of 47.0 weight percent (34.8 mole percent).

EXAMPLE II

This example demonstrates the preparation of an N-phenyl maleimide/alpha methyl styrene copolymer by suspension polymerization.

32.7 grams of the N-phenyl maleimide produced as described in Example I, 23 grams of alpha methyl styrene, 0.55 gram of tricalcium phosphate, 0.0085 gram of sodium bisulfite, 111 grams of water, 0.111 gram of antioxidant (Irganox 1076), 0.055 benzoyl peroxide initiator were added to a Citrate bottle and purged with nitrogen. The Citrate bottle was transferred to a bottle polymerizer and polymerized at 112° C. for about 1¼ hours, at 120° C. for ½ hour and then cooled. The polymerization product was recovered by precipitation in methanol and drying.

The resulting N-phenyl maleimide/alpha methyl styrene copolymer was tested and found to have a peak Mn of 130,000 a glass transition temperature of 254° C. as measured by dynamic mechanical analysis (DMA) and an N-phenyl maleimide content of 59.0 weight percent (50.0 mole percent).

EXAMPLE III

This examples demonstrates the preparation of a polyblend of this invention.

About 2 grams of the N-phenyl-maleimide/styrene copolymer produced in Example I and about 5 grams Dylark 290 copolymer were dissolved in 50/50 methyl ethyl ketone (MEK)/tetrahydrofuran (THF) solvent solution and reprecipitated in hexane into powder form. The polymer powder was dried in a vacuum oven at 160° C. overnight and was compression molded into a 1/16" thick film sample using a molding pressure of about 10,000 psi and a mold temperature of about 240° C. for five minutes.

The resulting polyblend molded sample containing 28.6 weight percent N-phenyl maleimide/styrene copolymer exhibited a single glass transition temperature at 160° C. as measured by DMA.

EXAMPLE IV

This example demonstrates the preparation of another polyblend of this invention.

About 3 grams of the N-phenyl maleimide/styrene copolymer prepared in Example I and about 3 grams of Dylark 290 copolymer were dissolved in a 50/50 MEK/THF solvent solution and reprecipitated in hexane into powder form. The polymer powder was dried in a vacuum oven at 170° C. until constant weight was achieved. The resulting polymer was compression molded into a 1/16" thick film sample using a molding pressure of about 10,000 psi and a mold temperature of about 240° C. for five minutes.

The resulting polyblend molded sample containing 50 weight percent N-phenyl maleimide/styrene copolymer exhibited a single glass transition temperature of 166° C. as measured by DMA.

EXAMPLE V

This example demonstrate the preparation of another polyblend of this invention.

About 1 gram of the N-phenyl maleimide/alpha methyl styrene copolymer prepared in Example II and about 4 grams of Dylark 290 copolymer were dissolved in THF, reprecipitated in hexane into powder form, and dried in a vacuum oven at 150° C. until constant weight was achieved.

The resulting polymer powder was compression molded into a 1/16" thick film sample using a molding pressure of about 10,000 psi, and a mold temperature of about 280° C. for about 5 minutes.

The resulting polyblend molded sample containing 20 weight percent N-phenyl malemide/alpha methyl styrene copolymer exhibited a single glass transition temperature of 160° C. as measured by DMA.

The following Table better illustrates the miscibility of the polyblends of this invention by a comparison of the glass transition temperatures of each copolymer employed in the examples as compared to the glass transition temperatures of the prepared polyblends.

TABLE

| GLASS TRANSITION TEMPERATURES | |
|---|---|
| Copolymer | Tg(°C.) |
| Dylark 290 copolymer (17% maleic anhydride/83% styrene) | 148 |
| N—phenyl maleimide/styrene (Example I) | 212 |
| N—phenyl maleimide/alpha-methyl styrene (Example II) | 254 |

TABLE-continued
GLASS TRANSITION TEMPERATURES

| Copolymer | Tg(°C.) |
|---|---|
| Polyblend (wt %) | |
| Copolymer of Example I/Dylark 290 (28.6/71.4) | 160 |
| Copolymer of Example I/Dylark 290 (50.0/50.0) | 166 |
| Copolymer of Example II/Dylark 290 (20.0/80.0) | 160 |

The data set forth in the Table serve to illustrate that the compositions of this invention quite surprisingly exhibit miscibility as evidenced by a single glass transition temperature.

It will be evident from the foregoing that various modifications can be made to this invention. Such, however, are considered within the scope of this invention.

What is claimed is:

1. A miscible polyblend comprising a first and a second copolymer, the first copolymer consists of an α,β-ethylenically unsaturated dicarboxylic acid or its anhydride copolymerized with a monovinyl-substituted aryl hydrocarbon monomer and, the second copolymer consists of an imide derivative of maleic anhydride and having the general formula:

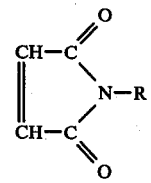

wherein R represents —CH$_3$, —CH$_2$H$_5$, —C(CH$_3$)$_3$, a phenyl or substituted phenyl group or a cycloalkyl or substituted cycloalkyl group copolymerized with a monovinyl substituted aryl hydrocarbon monomer.

2. The polyblend of claim 1 in which said first copolymer is a non-equimolar copolymer containing less than 50 mole percent of an α,β-ethylenically unsaturated dicaboxylic acid or its anhydride and more than 50 percent mole percent of a monovinyl-substituted aryl hydrocarbon monomer.

3. The polyblend of claim 2 in which said first copolymer is styrene-maleic anhydride.

4. The polyblend of claim 2 in which said first copolymer is impact-modified.

5. The polyblend of claim 4 in which said impact modifier is a rubber.

6. The polyblend of claim 1 in which said second copolymer is N-phenyl maleimide/alpha-methyl styrene.

7. The polyblend of claim 1 in the form of a molded article.

* * * * *